United States Patent
Engelen et al.

(10) Patent No.: US 9,761,259 B2
(45) Date of Patent: Sep. 12, 2017

(54) TAPE HEADS WITH SUB-AMBIENT PRESSURE CAVITIES

(71) Applicant: International Business Machines Corporation, Armonk, NY (US)

(72) Inventors: Johan B. C. Engelen, Zurich (CH); Mark A. Lantz, Thalwil (CH); Hugo E. Rothuizen, Oberrrieden (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/984,671

(22) Filed: Dec. 30, 2015

(65) Prior Publication Data

US 2016/0111120 A1 Apr. 21, 2016

Related U.S. Application Data

(62) Division of application No. 14/829,921, filed on Aug. 19, 2015.

(30) Foreign Application Priority Data

Aug. 20, 2014 (GB) .................................. 1414809.2

(51) Int. Cl.
*G11B 5/255* (2006.01)
*G11B 5/60* (2006.01)
(Continued)

(52) U.S. Cl.
CPC ........ *G11B 5/6082* (2013.01); *G11B 5/00813* (2013.01); *G11B 5/1871* (2013.01); *G11B 5/255* (2013.01); *G11B 5/60* (2013.01)

(58) Field of Classification Search
None
See application file for complete search history.

(56) References Cited

U.S. PATENT DOCUMENTS 3,573,769 A 4/1971 Flora
3,582,917 A 6/1971 Hertrich et al.
(Continued)

FOREIGN PATENT DOCUMENTS

EP 0767459 A1 4/1997
EP 1626392 A1 * 2/2006 ........... G11B 5/3163
(Continued)

OTHER PUBLICATIONS

Part One of English-machine translation of JP 2006-127730A to Morita et al, publsihed on May 18, 2006.*
(Continued)

*Primary Examiner* — Will J Klimowicz
(74) *Attorney, Agent, or Firm* — Cantor Colburn LLP; Rabin Bhattacharya

(57) ABSTRACT

A unidirectional and bi-directional tape head with sub-ambient pressure cavities. The tape head is adapted for reading and/or writing to a magnetic tape. The tape head includes: a tape-bearing surface; a transducer area, having at least one transducer designed for reading and/or writing to the magnetic tape; a cavity open on the tape-bearing surface adjacent to the transducer area that extends parallel to the transducer area and transversally to the longitudinal direction of circulation of the tape such that an opening of the cavity faces the tape in operation; and one or more air bleed slots connected to the cavity. The cavity is further dimensioned and arranged with respect to the transducer area to create, upon circulation of the tape in operation, sub-ambient pressure therein.

12 Claims, 4 Drawing Sheets

(51) Int. Cl.
*G11B 5/008* (2006.01)
*G11B 5/187* (2006.01)

(56) References Cited

U.S. PATENT DOCUMENTS

| | | | |
|---|---|---|---|
| 3,643,037 A | 2/1972 | Norwood | |
| 3,872,507 A * | 3/1975 | Sano | G11B 5/53 360/101 |
| 4,298,899 A | 11/1981 | Argumedo et al. | |
| 5,220,473 A | 6/1993 | Brock et al. | |
| 5,774,306 A * | 6/1998 | Wang | G11B 5/10 360/241.1 |
| 5,969,912 A | 10/1999 | Cope | |
| 6,122,147 A | 9/2000 | Fahimi | |
| 6,282,055 B1 * | 8/2001 | Lakshmikumaran | G11B 5/10 360/121 |
| 6,433,959 B1 | 8/2002 | Lakshmikumaran et al. | |
| 6,822,820 B1 | 11/2004 | Winarski et al. | |
| 7,006,329 B2 * | 2/2006 | Johnson | G11B 5/1871 360/221 |
| 8,310,783 B2 * | 11/2012 | Kawakami | G11B 5/00821 360/122 |
| 2002/0171974 A1 | 11/2002 | Dugas | |
| 2003/0151853 A1 | 8/2003 | Fahimi et al. | |
| 2004/0240113 A1 | 12/2004 | Johnson et al. | |
| 2006/0056109 A1 | 3/2006 | Saliba | |
| 2007/0183091 A1 | 8/2007 | Saliba | |
| 2009/0154024 A1 | 6/2009 | Hachisuka | |
| 2009/0310248 A1 | 12/2009 | Hachisuka | |
| 2011/0002065 A1 | 1/2011 | Dugas et al. | |
| 2014/0002928 A1 | 1/2014 | Dellmann et al. | |
| 2016/0055867 A1 | 2/2016 | Engelen et al. | |

FOREIGN PATENT DOCUMENTS

| | | | | |
|---|---|---|---|---|
| GB | 1424782 A * | 2/1976 | | G11B 5/53 |
| JP | 57200922 A * | 12/1982 | | |
| JP | 07044821 A * | 2/1995 | | |
| JP | 2006127730 A | 5/2006 | | |
| WO | WO 9118389 A1 * | 11/1991 | | G11B 5/4893 |
| WO | WO 0237478 A2 * | 5/2002 | | G11B 5/10 |

OTHER PUBLICATIONS

Part Two of English-machine translation of JP 2006-127730A to Morita et al, publsihed on May 18, 2006.*
List of IBM Patents or Patent Applications Treated as Related (Appendix P); Filed Dec. 30, 2015, 2 pages.

* cited by examiner

TAPE HEADS WITH SUB-AMBIENT PRESSURE CAVITIES

DOMESTIC AND FOREIGN PRIORITY

This application is a divisional of U.S. patent application Ser. No.: 14/829,921, filed Aug. 19, 2015, which claims priority under 35 U.S.C. §119 from Great Britain Application No. 1414809.2 filed Aug. 20, 2014, the entire contents of both are incorporated herein by reference.

BACKGROUND

The invention relates in general to the field of tape heads and related apparatuses for reading and/or writing to magnetic tapes. In particular, it is directed to tape heads designed to reduce friction with and wear of the tape.

To write and read at high areal densities as used by modern tape systems, the magnetic tape has to be in close proximity to the read/write elements on a tape read/write head. Research efforts are spent to arrive at a viable solution to reduce the distance between the tape and the head, in operation, as reducing this spacing allows for increasing the areal density. The current technology typically requires a tape-head spacing of several tens of nanometers.

When a tape is streamed over a surface an air bearing forms, which prevents the tape from coming in close contact with the head. Thus, minimal tape-head distances cannot reach the nanometer-range. A solution that is typically used by current tape heads is to rely on skiving (i.e., sharp) edges to scrape off (skive off) the air. This forms a low pressure region directly after the skiving edge, such that the tape is pushed into intimate contact with the tape head, due to the higher air pressure on the opposite side of the tape. An advantage of this solution is that the tape-head spacing is small and stable over a wide range of tape speeds. A disadvantage is the friction and wear that arise due to the direct contact and the high pressure with which the tape is pushed into contact with the head. To prevent excessive friction, the tape can be intentionally made rough (i.e. with sporadic bumps on the tape surface so that only a fraction of the tape surface is in actual contact with the tape bearing surface of the head). Effectively, these bumps increase the tape-head spacing.

Now, to increase the linear density, one can seek to reduce the tape-head spacing by using a smoother tape. However, using a smoother tape results in an increased friction that can degrade the recording and read back performance of the tape drive. In extreme cases, friction can even cause the tape drive motors to stall and tape breakage.

In the related technical field of hard disk drives (HDDs), the magnetic medium is not in direct contact with the read/write head. There is an air bearing between the head and the disk. Because the disk is a rigid surface, the head can be pushed towards the disk to reduce the air bearing thickness such that the disk-head spacing is only a few nanometers, which can be compared with several tens of nanometers for tape media. The non-contact recording in an HDD virtually eliminates head wear, while operating at very small disk-head spacing.

SUMMARY

The present invention provides a unidirectional tape head for reading and/or writing to a magnetic tape, the tape head including: a tape-bearing surface; a transducer area with at least one transducer that is a read and/or write element designed for reading and/or writing to the magnetic tape; a cavity open on the tape-bearing surface adjacent to the transducer area that extends parallel to the transducer area and transversally to the longitudinal direction of circulation of the tape such that an opening of the cavity faces the tape in operation; and one or more air bleed slots connected to the cavity, wherein the cavity is further dimensioned and arranged with respect to the transducer area to create sub-ambient pressure therein upon circulation of the tape in operation.

The present invention also provides a bi-directional tape head for reading and/or writing to a magnetic tape, the tape head including: a tape-bearing surface; a transducer area with at least one transducer that is a read and/or write element designed for reading and/or writing to the magnetic tape; a first cavity open on the tape-bearing surface adjacent to the transducer area that extends parallel to the transducer area and transversally to the longitudinal direction of circulation of the tape such that an opening of the cavity faces the tape in operation; and a second cavity open on the tape-bearing surface, dimensioned and arranged with respect to the transducer area similarly as the first cavity, and located opposite to the first cavity with respect to the transducer area; wherein the first cavity and second cavity are further dimensioned and arranged with respect to the transducer area to create sub-ambient pressure therein upon circulation of the tape in operation.

BRIEF DESCRIPTION OF SEVERAL VIEWS OF THE DRAWINGS

Through the more detailed description of some embodiments of the present invention in the accompanying drawings, the above and other objects, features and advantages of the present invention will become more apparent, wherein the same reference generally refers to the same components in the embodiments of the present invention.

DETAILED DESCRIPTION

Figure 1:
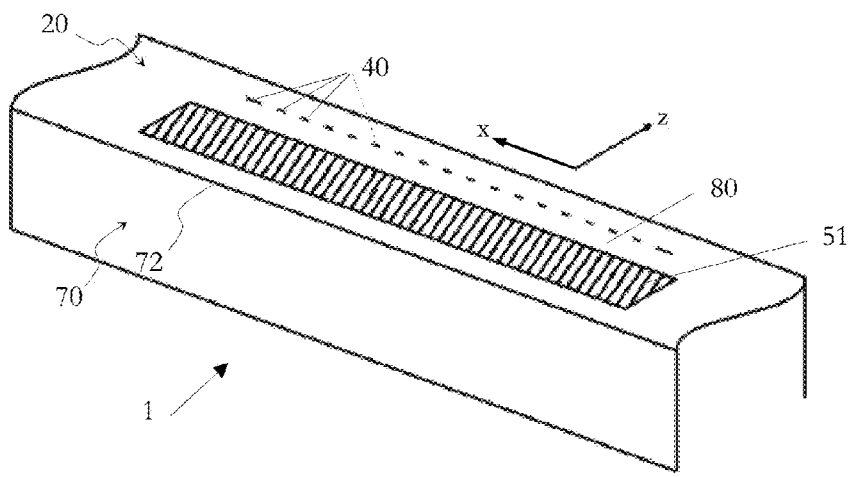
FIG. 1 shows a 3D view in the form of a unidirectional head with a sharp edge in accordance with one or more embodiments.
Figure 2:
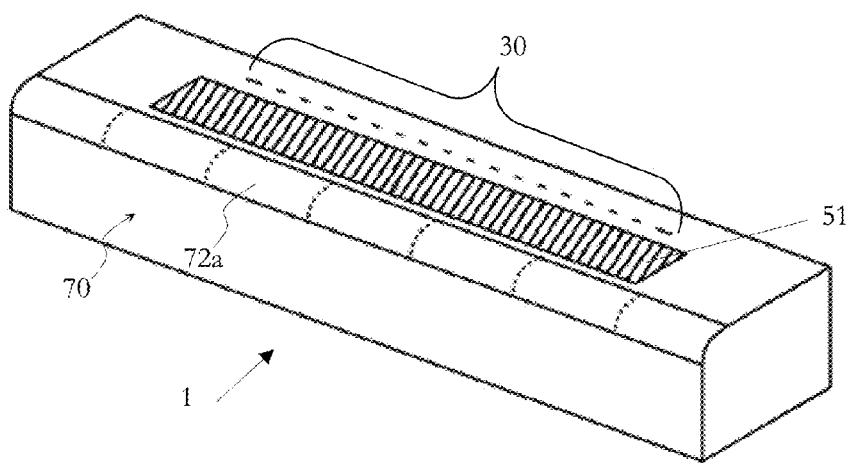
FIG. 2 shows a 3D view in the form of a unidirectional head with a rounded edge in accordance with one or more embodiments.
Figure 3:
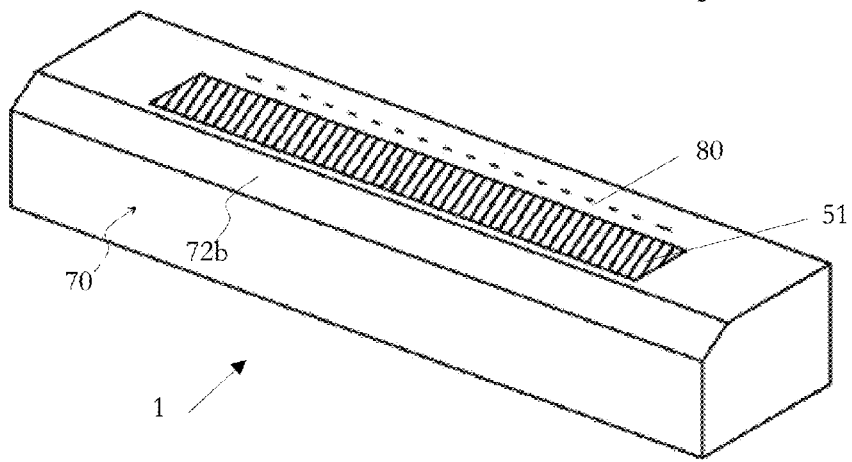
FIG. 3 shows a 3D view in the form of a unidirectional head with a beveled edge in accordance with one or more embodiments.

The present invention revolves around a tape-facing surface, which is structured such that the resulting air-bearing leads to stable tape-head spacing and with very close tape-head spacing only in a small desired area (close to the read/write elements), while keeping friction to acceptable levels.

In reference to FIGS. 1-12, the present invention concerns structured tape head 1. This tape head is generally adapted for reading and/or writing to magnetic tape 10. To that aim, the head exhibits tape-bearing surface 20 that includes: transducer area 30, as usual in the art. Also known in the art, transducer area 30 includes: at least one transducer 40, and more typically, several transducers 40, which are each a read and/or write element designed for reading and/or writing to the magnetic tape in operation. Transducer area 30 can extend longitudinally along direction x and transversally to the longitudinal direction z of circulation of the tape. Typically, tape head 1 includes several transducers 40 arranged along the longitudinal direction x.

The present invention further exhibits cavity 51 (i.e., a hollow area or a pocket) adjacent to transducer area 30. As seen in FIGS. 4-6, 7 and 9, bi-directional heads typically include two cavities 51, 52, whereas the unidirectional heads seen in FIGS. 1-3 and 8 include only one cavity. For a unidirectional head, cavity 51 is preferably located "before" transducer area 30 in order to attract a portion of the tape before the latter comes into contact with transducer area 30 to ensure a good contact at the level of transducer area 30. In a bi-directional head, second cavity 52 is dimensioned and arranged with respect to transducer area 30 similarly to first cavity 51, and located opposite to first cavity 51 with respect to transducer area 30.

First cavity 51 and second cavity 52 are open on the tape-bearing surface and extends parallel to the longitudinal direction of transducer area 30 (i.e., transversally to direction z of circulation of the tape) such that an opening of the cavities face the tape in operation. Finally, first cavity 51 and second cavity 52 are dimensioned and arranged with respect to transducer area 30 in order to generate sub-ambient pressure L in the cavity upon circulation of the tape in operation.

Figure 11:
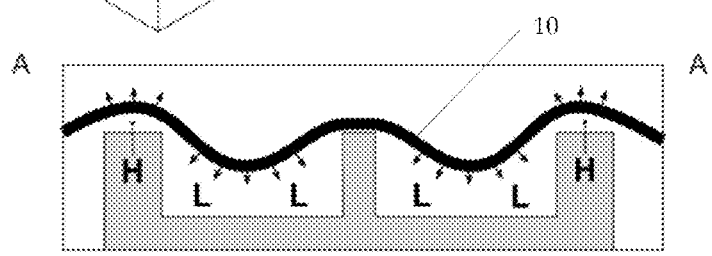
FIG. 11 is a first cross-sectional view showing a crenellated structure in accordance with one or more embodiments.
Figure 12:
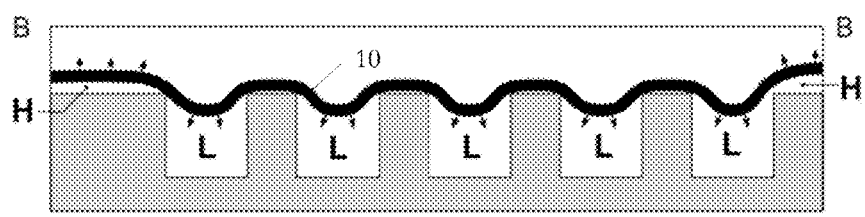
FIG. 12 is a second cross-sectional view showing a crenellated structure in accordance with one or more embodiments.

Referring now to FIGS. 11 and 12, tape 10 is accordingly pushed into pockets 51, 52 such that no friction occurs in corresponding areas 51, 52. Compared to prior art solutions, and thanks to the adjacent aspiration, a very close tape-head spacing is therefore achieved in what is a comparatively reduced area 30, all things being equal.

While such cavities shall generally result in improving the tape-head contact, it is recommended to design these cavities such that their length in direction x and transversally to direction z of circulation of the tape be essentially equal to the length of transducer area 30 to ensure an improved contact along the entire transducer area.

To that aim, first cavity 51 and second cavity 52 are typically at least as long as transducer area 30. However, first cavity 51 and second cavity 52 should not exceed the total length of transducer area 30 by too much in order to prevent air leaking in from the sides. As experiments have shown, the cavities should preferably not exceed the length of transducer area 30 by more than half the distance (0.5 mm) between the edge of the tape and the edge of transducer area 30 in operation. As a result, the length of first cavity 51 and/or second cavity 52 should not exceed the length of transducer area 30 by more than 0.25 mm.

The precise dimensions of the cavity depends on the specific parameters used for the tape head. In general, experiments and simulations conducted by the inventors have led to the conclusion that best results will be obtained for cavities having a depth between 0.5 and 5.0 µm.

The width of the cavity as measured along the longitudinal direction z of circulation of the tape can be further optimized independently from its depth. Best results are generally obtained for cavity widths between 50 and 200 µm.

Referring now to FIGS. 1-9, in embodiments of the present invention, tape head 1 can nonetheless include: unrecessed area 80 on the tape-bearing surface, where unrecessed area 80 extends parallel to the longitudinal direction x of transducer area 30, between first cavity 51 and second cavity 52 and transducer area 30, thereby forming a bearing area between an edge of the first cavity 51 and second cavity 52 and a proximal, parallel edge of transducer area 30 spanned by transducers 40. Providing such unrecessed areas allows the locations of the cavities with respect to the transducers to be optimized, taking into account the many parameters involved, starting with the sub-ambient pressures L created as well as the flexibility of the tape. It has been observed that better results are obtained if the width of unrecessed area 80 as measured along direction z is about half the width of the cavity (i.e., the width should be between 25 and 100 µm, owing to the preferred values mentioned earlier in respect of the width of the cavities).

Figure 7:
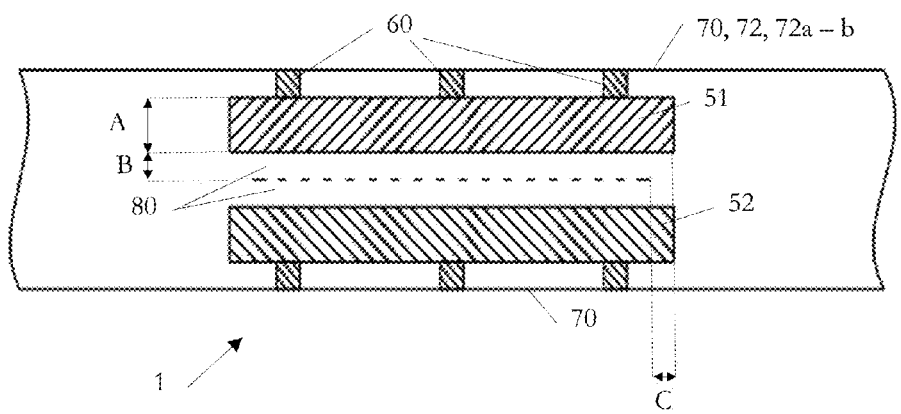
FIG. 7 is an overhead view of a bidirectional head in accordance with one or more embodiments.
Figure 8:
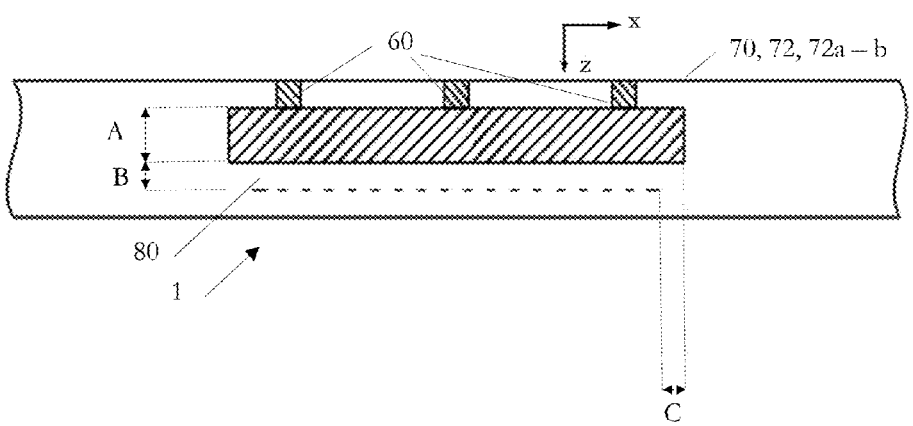
FIG. 8 is an overhead view of a unidirectional head in accordance with one or more embodiments.

As illustrated in FIGS. 7 and 8, dimensions A, B and C can further be jointly optimized. Optimal results have so far been obtained for A=100 µm (±20%), approximately ¼ of the width of the head (that typically is 400 µm±20%); B=50 µm (±20%), approximately ⅛ of the width of the head; and C=250 µm (±20%). One skilled in the art will recognize that these values can be adjusted in correspondence to the stiffness of the tape used in combination with the head.

Figure 4:
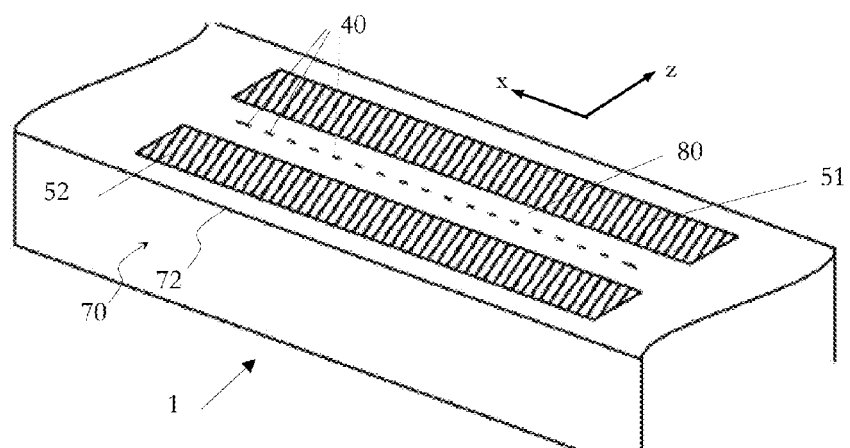
FIG. 4 shows a 3D view in the form of a bidirectional head with a sharp edge in accordance with one or more embodiments.
Figure 5:
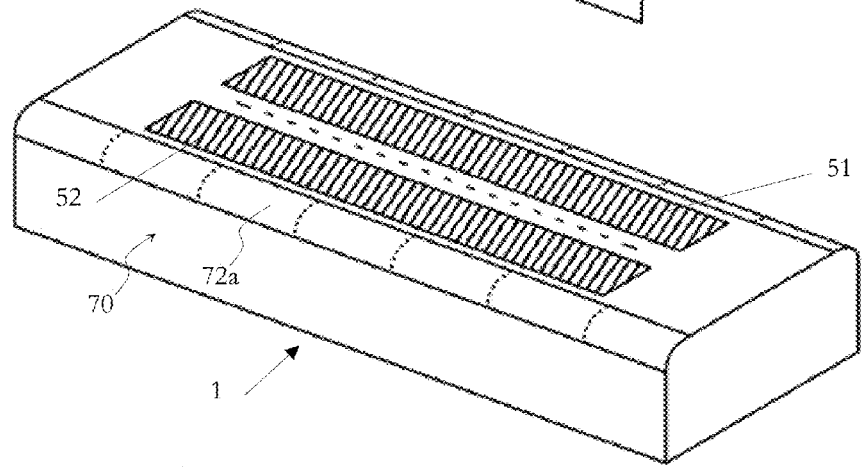
FIG. 5 shows a 3D view in the form of a bidirectional head with a rounded edge in accordance with one or more embodiments.
Figure 6:
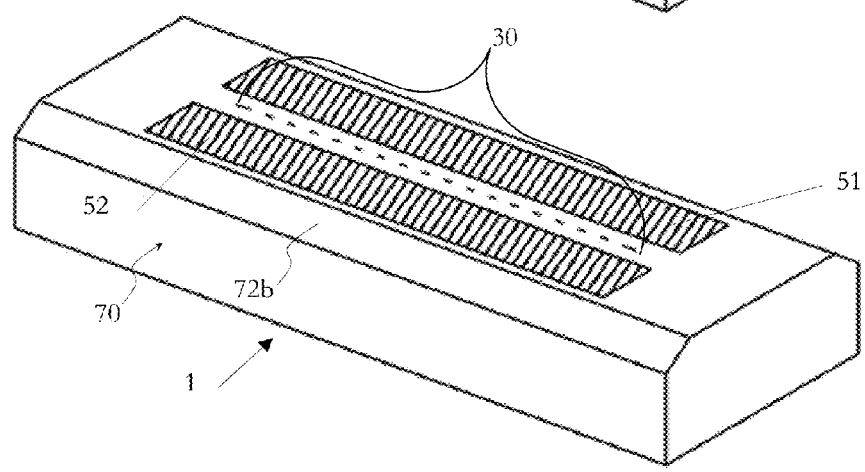
FIG. 6 shows a 3D view in the form of a bidirectional head with a beveled edge in accordance with one or more embodiments.

In embodiments of the present invention, tape head 1 can include sharp edges 72 that are parallel to direction x and transversally x to direction z of circulation of the tape as seen in FIGS. 1 and 4. This is to help create a low pressure region directly after sharp edge 72. Tape head 1 can include beveled lateral edge 72a or rounded lateral edge 72b proximal to cavity 51 as seen in FIGS. 2, 3, 5 and 6. Rounding or beveling these edges can provide broader operating ranges for the wrap angles. If the edges are sharp, the edge will skive-off air for a slightly positive wrap angle like current tape heads. This creates a reduced air pressure and friction will be large. If the edge is rounded or beveled, small positive wrap angles are enabled for which no skiving effect will occur and hence friction will be lower relative to the former case.

Figure 9:
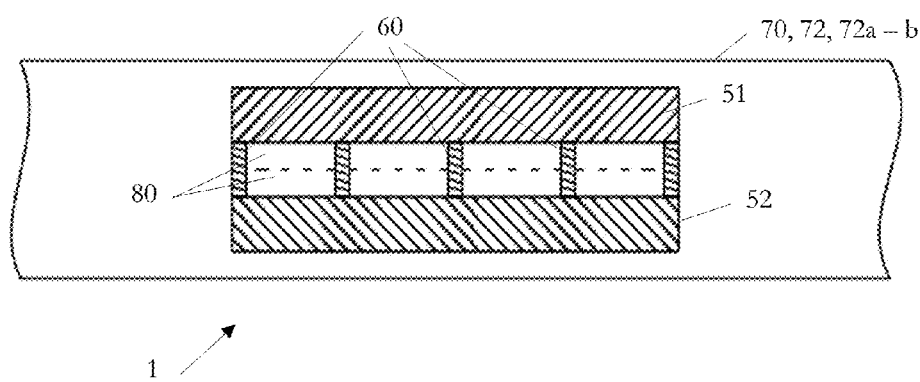
FIG. 9 is an overhead view of a unidirectional head in accordance with one or more embodiments.

Air bleed slots can be provided to reduce the air pressure differential and prevent the tape from being pushed too deep into the pockets. As seen in FIGS. 7-9, air bleed slots 60 can notably be arranged to connect to a cavity and ensure fluid communication therewith. The air bleed slots can notably connect cavity 51 to adjacent, lateral edge surface 70 (FIGS. 7 and 8) or another cavity 52 (FIG. 9) of tape head 1.

For instance, the air bleed slots can each have a width that is between 3 and 100 µm measured transversally to direction z of circulation of the tape and parallel to longitudinal direction x of transducer area 30. Similarly, the depth can be optimized, leading to values that are between 0.3 and 5.0 µm.

Figure 10:
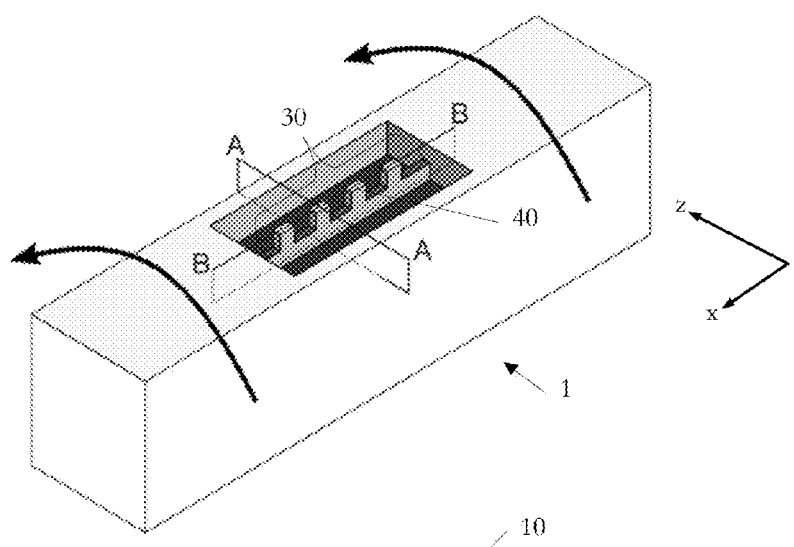
FIG. 10 is a 3D view in the form of a device with a transducer area forming a crenellated structure in accordance with one or more embodiments.

Referring now to FIGS. 10-12, tape head 1 can be provided with transducer area 30 that forms a crenellated structure such that transducers 40 protrude in a merlon fashion. Several transducers could possibly be arranged in one merlon of the crenellated structure. In fact, the top surface transducers will typically not span the whole flat, top surface of a corresponding merlon, such that a residual, peripheral area on the merlons will play the role of unrecessed area 80 and be similarly dimensioned.

To that aim, a vacuum cavity can be etched around read/write elements 40 (the crenellations). When streaming tape, sub-ambient pressure L results in an attractive force providing close tape-head contact. The crenellated structure is adjacent to first cavity 51 and second cavity 52. In FIG. 10, first cavity 51 and second cavity 52 can be regarded as a single super-cavity including: two compartments separated by the crenellated structure. As seen in FIGS. 11 and 12, sub-ambient pressures L are not only created on each side of transducer area 30, but also between each transducer 40. Thus, high (super-ambient) pressures H are developed above the unetched (or "high") parts of tape head 1 and the balance between low and high pressure regions provide a stable tape flight height. Using a crenellation can be leveraged to correct the sub-ambient pressures created by first cavity 51 and second cavity 52 and tune the tape-head distance. In addition, the crenellated structure also decreases the effective (hard) surface exposed to the tape such that friction is lowered in fine.

Finally, the present invention can also be embodied as a tape recorder, a tape machine or any apparatus for reading and/or writing to tapes, including one or more tape heads 1 as described earlier.

For completeness, first cavity 51, second cavity 52, and air slots 60 can be fabricated using conventional microfabrication processes (e.g., etching processes). Current tape heads are fabricated on an AlTiC substrate for which known etch recipes exist. The cavities can be formed by masking the tape head surface and etching the unmasked AlTiC. The cavities can be formed by a single etch step, or multiple etch steps to create more complicated topographies (e.g. cavities containing height steps or a sloped bottom).

Note that some of the concepts introduced here bear some resemblance with concepts already introduced in hard disk drives (HDD). HDD heads rely on the formation of an air bearing between the head and disk with positive and negative sub-ambient pressures relative to the ambient pressure in specific regions to obtain the desired close spacing between the head's reader/writer and the disk. However, there are substantial differences between tape and hard disk technologies such as the magnetic medium used (i.e., magnetic tape is thin and flexible, whereas a rigid disk is used in HDDs). In that respect, it should be noted that the HDD head has to be pushed towards the disc and the air bearing acts as a kind of cushion. This would not be possible with tapes as they are too flexible. Rather, the tape has to be attracted to the head with very close spacing using transducers.

More generally, there are special considerations to take into account in with magnetic tape technology compared with HDD technology. A tape head may have to function in both forward and backward directions, which depends on the head modules actually used. For instance, some head-assembly designs include: write-modules that operate uni-directional-only; heads that function in a different velocity range (the "tape" range being of 1-8 m/s, whereas it is of 10-35 m/s for HDD); and heads that are meant for flexible and exchangeable media, as opposed to hard disks, which can notably imply backwards compatibility with prior tape formats. Also, the same design may need to work for different tape media with different stiffness, as opposed to HDDs. Some tape heads can include up to 32 readers/writers, which implies a much larger transducer area such that more locations have to come in close proximity with the medium. Further, tape heads involve wrap angles that are very different from HDD's, since the pitch angle in HDDs is on the order of 0.005 degrees, whereas the wrap angle in a tape drive is between 1 and 2 degrees with a manufacturing tolerance of approximately 0.5 degrees.

Present inventors have performed interferometer measurements of tapes streaming over a head (test structures consisting of AlTiC bars with the same dimensions as a real tape head, and a real tape head) including vacuum cavities such as described above. The height profiles have confirmed that the tape is pushed into cavities 51, 52. The fact that they were able to make such interferometric measurements over long periods (up to several minutes) and with only few measurement artifacts shows that the interface is stable.

While the present invention has been described with reference to a limited number of embodiments, variants and the accompanying drawings, it will be understood by those skilled in the art that various changes can be made and equivalents can be substituted without departing from the scope of the present invention. In particular, a feature (device-like or method-like) recited in a given embodiment, variant or shown in a drawing can be combined with or replace another feature in another embodiment, variant or drawing, to obtain a new combination of features (not explicitly recited herein). The new combination of features would nevertheless remain within the scope of the present invention, especially where such a new combination would provide an advantage recited in the present description and notwithstanding the particular technical contexts in which the features constituting this new combination may have been described (e.g., for the mere sake of illustration). Also, provided that any such new combination makes sense for one skilled in the art in view of other elements described in the present invention such advantages are provided by the features described herein. Various combinations of the features described in respect to any of the above embodiments or variants can accordingly be contemplated that remain within the scope of the appended claims. In addition, many minor modifications can be made to adapt a particular situation to the teachings of the present invention without departing from its scope. Therefore, it is intended that the present invention not be limited to the particular embodiments disclosed, but that the present invention will include all embodiments falling within the scope of the appended claims. In addition, many variants not explicitly touched above can be contemplated. For example, a specific geometry of the cavities' openings and chamber can be optimized. The cavities need for instance not necessarily be cuboid. They can instead be given various possible degrees of sophistication, e.g., form a more complex polyhedron or have rounded edges and walls. For instance, cavities can be provided with multiple, different depths and/or exhibit some topography of itself (e.g., a sloped bottom or multiple step heights inside the cavity.

In embodiments of the present invention, the tape head includes: a cavity with a length transversally to the longitudinal direction of circulation of the tape that is essentially the same as a length of the transducer area. The length of the cavity does not exceed the length of the transducer area by more than 0.25 mm. The depth of the cavity is between 0.5 and 5.0 µm and the width of the cavity, as measured along the longitudinal direction of circulation of the tape, is between 50 and 200 µm.

Further, the tape head includes: one or more air bleed slots connecting to the cavity to ensure fluid communication with the cavity. The one or more air bleed slots are arranged to ensure fluid communication between the cavity and a lateral edge surface or another cavity of the tape head. Also, each of the one or more air bleed slots have a width that is between 3 and 100 µm that is measured transversally to the longitudinal direction of circulation of the tape and parallel to a longitudinal direction of the transducer area. The depth of each of the one or more air bleed slots is between 0.3 and 5.0 µm.

The tape head includes several transducers arranged along a longitudinal direction of the transducer area and transversally to the longitudinal direction of circulation of the tape. Further, the tape head can includes a second cavity that is dimensioned and arranged with respect to the transducer area similarly as the first cavity and located opposite to the first cavity with respect to the transducer area. The transducer area forms a crenellated structure such that the several transducers each protrude in a merlon fashion and wherein the crenellated structure is adjacent to each of the cavities. Also, the tape head includes: an unrecessed area on the tape-bearing surface, which extends parallel to the longitudinal direction of the transducer area and transversally to the longitudinal direction of circulation of the tape between the cavity and the transducer area. The width of the unrecessed area as measured along the longitudinal direction of circulation of the tape is between 25 and 100 µm. The head further includes: at least one beveled lateral edge or a rounded lateral edge proximal to the cavity, wherein the beveled lateral edge extends parallel to the longitudinal direction of the transducer area and transversally to the longitudinal direction of circulation of the tape.

The invention further provides an apparatus for reading and/or writing to tapes including one or more heads according to any one of the above embodiments.

What is claimed is:

1. A bi-directional tape head for reading and/or writing to a magnetic tape, the bi-directional tape head comprising:
   a tape-bearing surface that extends a first length perpendicular to a longitudinal direction of circulation of the tape;
   a transducer area with at least one transducer that is a read and/or write element designed for reading and/or writing to the magnetic tape, wherein the at least one transducer is arranged along an entire length of the transducer area;
   a first cavity open on the tape-bearing surface adjacent to the transducer area that extends parallel to the transducer area and transversally to the longitudinal direction of circulation of the tape such that an opening of the first cavity faces the tape in operation, wherein the first cavity extends a second length perpendicular to the longitudinal direction of circulation of the tape, wherein the second length is less than the first length; and
   a second cavity open on the tape-bearing surface, dimensioned and arranged with respect to the transducer area and located opposite to the first cavity with respect to the transducer area, wherein the second cavity extends a third length perpendicular to the longitudinal direction of circulation of the tape, wherein the third length is less than the first length;
   wherein the first cavity and second cavity are further dimensioned and arranged with respect to the transducer area to create sub-ambient pressure therein upon circulation of the tape in operation, and
   wherein the second length of the first cavity and the third length of the second cavity transversal to the longitudinal direction of circulation of the tape are at least the same as the length of the transducer area and do not exceed the length of the transducer area by more than 0.25mm, wherein the transducer area forms a crenellated structure such that several transducers protrude in a merlon fashion and the crenellated structure is adjacent to the first cavity and the second cavity.

2. The bi-directional tape head of claim 1, wherein a first depth of the first cavity is between 0.5 and 5.0 µm, and wherein a second depth of the second cavity is between 0.5 and 5.0 µm.

3. The bi-directional tape head of claim 1, wherein a first width of the first cavity, as measured along the longitudinal direction of circulation of the tape, is between 50 and 200 µm, and wherein a second width of the second cavity, as measured along the longitudinal direction of circulation of the tape, is between 50 and 200 µm.

4. The bi-directional tape head of claim 1, further comprising an unrecessed area on the tape-bearing surface that extends parallel to the longitudinal direction of the transducer area and transversally to the longitudinal direction of circulation of the tape between the first cavity and the second cavity.

5. The bi-directional tape head of claim 4, wherein a width of the unrecessed area measured along the longitudinal direction of circulation of the tape is between 25 and 100 µm.

6. The bi-directional tape head of claim 1, further comprising at least one beveled lateral edge proximal to one of the first cavity and the second cavity that extends parallel to the longitudinal direction of the transducer area and transversally to the longitudinal direction of circulation of the tape.

7. The bi-directional tape head of claim 1, further comprising at least one rounded lateral edge proximal to one of the first cavity and the second cavity and contiguous with a lateral edge surface of the bi-directional tape head, wherein the rounded lateral edge extends parallel to the longitudinal direction of the transducer area and transversally to the longitudinal direction of circulation of the tape.

8. The bi-directional tape head of claim 1, further comprising one or more air bleed slots connected to the first cavity and the second cavity.

9. The bi-directional tape head of claim 8, wherein the one or more air bleed slots are arranged to ensure fluid communication between the first cavity and at least one of a lateral edge surface and the second cavity of the bi-directional tape head.

10. The bi-directional tape head of claim 8, wherein each of the one or more air bleed slots has a width that is between 3 and 100 µm measured transversally to the longitudinal direction of circulation of the tape, and parallel to the longitudinal direction of the transducer area.

11. The bi-directional tape head of claim 8, wherein each of the one or more air bleed slots has a depth between 0.3 and 5.0 µm.

12. The bi-directional tape head of claim 1,
   wherein the first cavity further comprises:
   a first cavity wall extending perpendicular to a lateral axis of the bi-directional tape head and disposed at a first end of the first cavity; and a second cavity wall extending perpendicular to the lateral axis and disposed at a second end of the first cavity, and
wherein the second cavity further comprises:
a third cavity wall extending perpendicular to the lateral axis and disposed at a first end of the second cavity; and
a fourth cavity wall extending perpendicular to the lateral axis and disposed at a second end of the second cavity.

\* \* \* \* \*